US012583122B2

(12) United States Patent
    Pickerd et al.

(10) Patent No.: US 12,583,122 B2
(45) Date of Patent: Mar. 24, 2026

(54) AUTOMATED CAVITY FILTER TUNING USING MACHINE LEARNING

(71) Applicant: Tektronix, Inc., Beaverton, OR (US)

(72) Inventors: John J. Pickerd, Hillsboro, OR (US); Ajaiey Kumar Sharma, Everett, WA (US); Kan Tan, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 170 days.

(21) Appl. No.: 18/199,846

(22) Filed: May 19, 2023

(65) Prior Publication Data

US 2023/0398694 A1      Dec. 14, 2023

Related U.S. Application Data

(60) Provisional application No. 63/351,291, filed on Jun. 10, 2022.

(51) Int. Cl.
    B25J 9/16          (2006.01)
    G06T 7/70          (2017.01)
    (Continued)

(52) U.S. Cl.
    CPC .............. B25J 9/1697 (2013.01); G06T 7/70 (2017.01); G06T 11/001 (2013.01);
    (Continued)

(58) Field of Classification Search
    CPC ........ B25J 9/1697; G06T 7/70; G06T 11/001; G06T 11/206; G06T 2207/10024;
    (Continued)

(56) References Cited

U.S. PATENT DOCUMENTS 9,625,556 B1 * 4/2017 Tsironis ................. G01R 27/32
9,647,632 B2 * 5/2017 Lee .................... G01R 31/2822
                     (Continued)

FOREIGN PATENT DOCUMENTS

CN        101478069       1/2009
CN        104659460       5/2015
                    (Continued)

OTHER PUBLICATIONS

CN_114117901_A_translation.pdf (Year: 2022).*
                    (Continued)

*Primary Examiner* — Kyle T Johnson
(74) *Attorney, Agent, or Firm* — Miller Nash LLP; Andrew J. Harrington

(57)                ABSTRACT

A test and measurement instrument connects to one or more devices under test (DUT) having tuning screws, and to a robot, and has one or more processors to: command the robot to position the tuning screws on the DUTs to one or more sets of positions, each set of positions being a parameter set for the tuning screws, acquire a set of operating parameters for each parameter set from the DUTs, generate a parameter set image for each set, create a combined image of the parameter set images, provide the combined image to a machine learning system to obtain a predicted set of values, adjust the predicted set of values to produce a set of predicted positions, command the robot to position the tuning screws to positions in the set of predicted positions, obtain a set of tuned operating parameters from the DUTs, and validate operation of the DUTs.

20 Claims, 19 Drawing Sheets

(51) Int. Cl.
| | |
|---|---|
| *G06T 11/00* | (2006.01) |
| *G06T 11/20* | (2006.01) |
| *H04B 17/00* | (2015.01) |
| *H04W 24/06* | (2009.01) |

(52) U.S. Cl.
CPC ........ *G06T 11/206* (2013.01); *H04B 17/0085* (2013.01); *H04W 24/06* (2013.01); *G06T 2207/10024* (2013.01); *G06T 2207/20081* (2013.01); *G06T 2207/20084* (2013.01); *G06T 2207/20212* (2013.01); *G06T 2207/30108* (2013.01)

(58) Field of Classification Search
CPC . G06T 2207/20081; G06T 2207/20084; G06T 2207/20212; G06T 2207/30108; G06N 3/096; G01R 27/32; H04B 17/0085; H04W 24/06
See application file for complete search history.

(56) References Cited

U.S. PATENT DOCUMENTS

| | | | | |
|---|---|---|---|---|
| 2007/0182424 | A1* | 8/2007 | Benedikt | G01R 27/32 |
| | | | | 324/637 |
| 2015/0061720 | A1* | 3/2015 | Takano | G01R 31/2642 |
| | | | | 324/762.01 |
| 2019/0140626 | A1 | 5/2019 | Juntunen et al. | |
| 2022/0311513 | A1 | 9/2022 | Pickerd et al. | |
| 2022/0343141 | A1* | 10/2022 | Lan | H01P 1/207 |
| 2022/0377231 | A1* | 11/2022 | Berg | G02B 6/3843 |
| 2023/0398694 | A1* | 12/2023 | Pickerd | B25J 9/1697 |
| 2024/0367314 | A1* | 11/2024 | Ito | G06N 20/00 |

FOREIGN PATENT DOCUMENTS

| | | | | | |
|---|---|---|---|---|---|
| CN | 104659460 | A | * | 5/2015 | |
| CN | 105680827 | | | 6/2016 | |
| CN | 106814307 | | | 6/2017 | |
| CN | 106814307 | A | * | 6/2017 | G01R 31/2822 |
| CN | 107769802 | | | 3/2018 | |
| CN | 107769802 | A | * | 3/2018 | |
| CN | 105680827 | B | * | 6/2018 | |
| CN | 108270057 | | | 7/2018 | |
| CN | 113255222 | | | 8/2021 | |
| CN | 114117901 | | | 3/2022 | |
| CN | 114117901 | A | * | 3/2022 | |
| CN | 113255222 | B | * | 10/2023 | G06F 16/367 |
| EP | 4484967 | A1 | * | 1/2025 | G01R 15/06 |
| GB | 1253306 | A | * | 11/1971 | |

| | | | |
|---|---|---|---|
| KR | 102412092 | | 4/2012 |
| PL | 214091 | | 1/2009 |
| WO | 2020242367 | | 12/2020 |

OTHER PUBLICATIONS

CN_104659460_A_I_translation.pdf (Year: 2015).*
CN_105680827_B_I_translation.pdf (Year: 2018).*
CN_106814307_A_I_translation.pdf (Year: 2017).*
CN_107769802_A_I_translation (Year: 2018).*
CN_113255222_B_I_translation (Year: 2023).*
EP_4484967_A1_I_translation (Year: 2025).*
Jinzhu Zhou et al, "Intelligent tuning for microwave filters based on multi-kernel machine learning model", 2013 5th IEEE International Symposium on Microwave, Antenna, Propagation and EMC Technologies for Wireless Communications, Oct. 29, 2023, pp. 259-266, Beijing, China.
Jinzhu Zhou et al, "Support-Vector Modeling and Optimization for Microwave Filters Manufacturing Using Small Data Sets", 2012 10th IEEE International Conference on Industrial Informatics, Jul. 25, 2012, pp. 202-207, IEEE, Piscataway, NJ.
Simon Lindstahl et al, "Reinforcement Learning with Imitation for Cavity Filter Tuning", 2020 IEEE/ASME International Conference on Advanced Intelligent Mechatronics, Jul. 6, 2020, pp. 1335-1340, IEEE, DOI: 10.1109/AIM43001.2020.9158839 [retrieved online Dec. 8, 2023].
Leyu Bi et al, "Intelligent Tuning of Microwave Cavity Filters Using Granular Multi-Swarm Particle Swarm Optimization", IEEE Transactions on Industrial Electronics, Dec. 3, 2021, pp. 12901-12911, vol. 68 No. 12, IEEE, Piscataway, NJ.
European Patent Office, Extended European Search Report and Written Opinion for Application No. 23178256.6, Nov. 23, 2023, 14 pages, Munich Germany.
Spaceforest, Filter Tuning Solutions, webpage, available at https://spaceforest.pl/filter-tuning-solutions/, last accessed May 19, 2023, 7 pages.
SpaceForest, SpaceForest company presentation—Filter Tuning Solutions, video on YouTube.com, available at https://youtu.be/Z8zKAc9areM, last accessed May 19, 2023, 1 page.
J. J. Michalski, Artificial Neural Networks Approach in Microwave Filter Tuning, Progress in Electromagnetics Research M, 2010, pp. 173-188, vol. 13. Retrieved from the Internet: <https://www.jpier.org/issues/volume.html?paper=10053105> <DOI: 10.2528/PIERM10053105>.
Zhiyang Wang et al, Learning Human Strategies for Tuning Cavity Filters with Continuous Reinforcement Learning, Applied Sciences, Feb. 5, 2022, 20 pages, 12(5):2409, Retrieved from the Internet: <https://www.mdpi.com/2076-3417/12/5/2409> <DOI: 10.3390/app12052409>.

* cited by examiner

AUTOMATED CAVITY FILTER TUNING USING MACHINE LEARNING

CROSS-REFERENCE TO RELATED APPLICATIONS

This disclosure claims benefit of U.S. Provisional Application No. 63/351,291, titled "AUTOMATED CAVITY FILTER TUNING USING MACHINE LEARNING," filed on Jun. 10, 2022, the disclosure of which is incorporated herein by reference in its entirety.

TECHNICAL FIELD

This disclosure relates to test and measurement systems, and more particularly to instruments, methods, and systems that employ machine learning for automated tuning of a cavity filter or other similar device under test (DUT).

BACKGROUND

RF cavity filters, diplexers, and duplexers are common RF components in transmitter, receiver, and transceiver circuits for cellular and satellite communications, radar, and other sensing applications. These devices are all tunable, typically using tuning screws.

As an example, a diplexer is a 3-port RF device, which enables the use of two signal paths on the same antenna or transmission line. This is done by frequency division using filters, either high-pass, low-pass, or band-pass filters. The same antenna could send and receive signals at two different frequencies. For a diplexer to function well, the quality and attenuation of the filters must scale with how close the signals are in frequency, at what power levels they operate, and what nonlinearities are expected.

Diplexers are often used in telecommunications, where many modulation methods and carriers operate on the same antenna. For example, cellular base stations can transmit and receive CDMA (Code-Division Multiple Access), LTE (Long-Term Evolution), or GSM (Global System for Mobile communications) signals on the same antenna, as a cell site.

A duplexer provides another example, also a 3-port RF device. It separates transmit and receive signals from an antenna to two different signal paths based on direction. These transmit and receive signals may operate at the same frequency. A duplexer enables true two-way communication from a single antenna. For example, a duplexer can be used in a radar system where the high-power transmitter signals need to be isolated from the sensitive receiver circuitry but operate on the same antenna.

Either switched systems or magnetic circulators are used to create the isolation between the incoming and outgoing signals within a duplexer. Duplexers are limited by how well they can isolate the receive path from the transmit path. With radar transmit/receive (TR) modules, the transmit and receive frequencies are typically remarkably close, and can only reasonably be separated through duplexing.

FIG. 1 shows an example of a duplexer and its many tuning screws. The three ports of a duplexer comprise one input and two outputs. Each output has a transfer function of a bandpass filter with different center frequencies adjacent to each other as shown in FIG. 2. Some devices may incorporate a low pass filter and high pass filter. FIG. 3 shows a circuit simulation model of two of the three ports from input to one of the bandpass outputs.

As mentioned above, one can tune the characteristics of these devices using tuning screws. Traditionally, manufacturers tune these tuning screws manually, which takes a long time in manufacturing, raising costs and delaying manufacturing.

DESCRIPTION

The embodiments perform robot tuning of cavity filters, such as diplexers, and duplexers and/or other similar kinds of cavity-tuning devices which have tuning screws. Wireless communications antenna installations use these types of devices extensively. The embodiments use a one-time prediction from a trained deep learning neural network. A robot then positions the tuning screws to the predicted optimal tuning position. Traditionally, tuning the devices manually takes a very long time in manufacturing. The machine-learning-based process according to embodiments would greatly reduce the amount of time to tune each device.

U.S. patent application Ser. No. 17/701,186, titled "OPTICAL TRANSMITTER TUNING USING MACHINE LEARNING AND REFERENCE PARAMETERS," filed Mar. 22, 2022, the entire contents of which are hereby incorporated by reference, describes systems and methods for performing tuning of optical transceivers using multiple sets of reference tuning parameters. Embodiments apply the concept of sets of reference tuning parameters to the tuning of cavity filters and similar DUTs. For example, in the case of a duplexer, a position vector represents the tuning parameters as the position vector for a set of tuning screws. The tuning screw position may be represented as an angle of rotation from a reference position, or it may be represented as linear depth position of the screw inserted into the tuning cavity.

Figure 4:
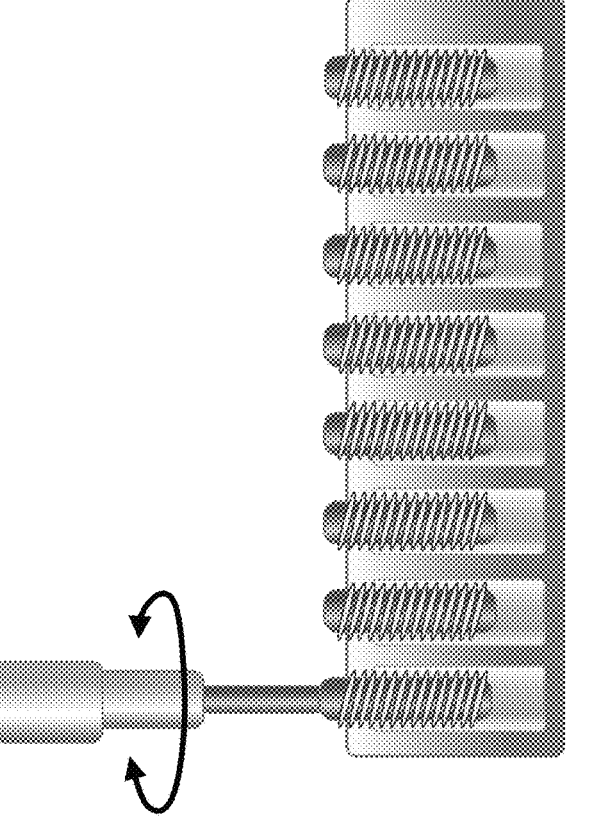
FIG. 4 shows a set of tuning screws set to a zero-reference position.

The process creates a set of multiple reference tuning parameter sets or vectors to characterize the device for the neural network, referred to herein as parameter sets. Some embodiments use three parameter sets. The discussion below will focus on three parameter sets to provide ease of understanding, but more or fewer reference parameter sets may also be used. In the case of three reference parameter sets the three reference parameter sets may be referred to as delta1Par, delta2Par, and meanPar. The delta1Par reference set has set all the tuning screws to their maximum depth into the tuning cavity. This can be defined to be the delta1Par reference parameter set, or the maximum parameter set, shown in FIG. 4.

Figure 5:
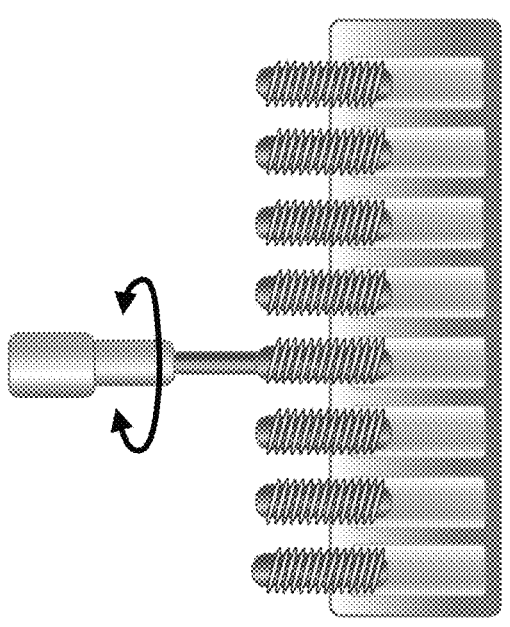
FIG. 5 shows a set of tuning screws set to the max reference position.

In the delta2Par reference set, or the minimum parameter set, the robot has set all the tuning screws to their minimum depth into the tuning cavity, shown in FIG. 5.

Figure 6:
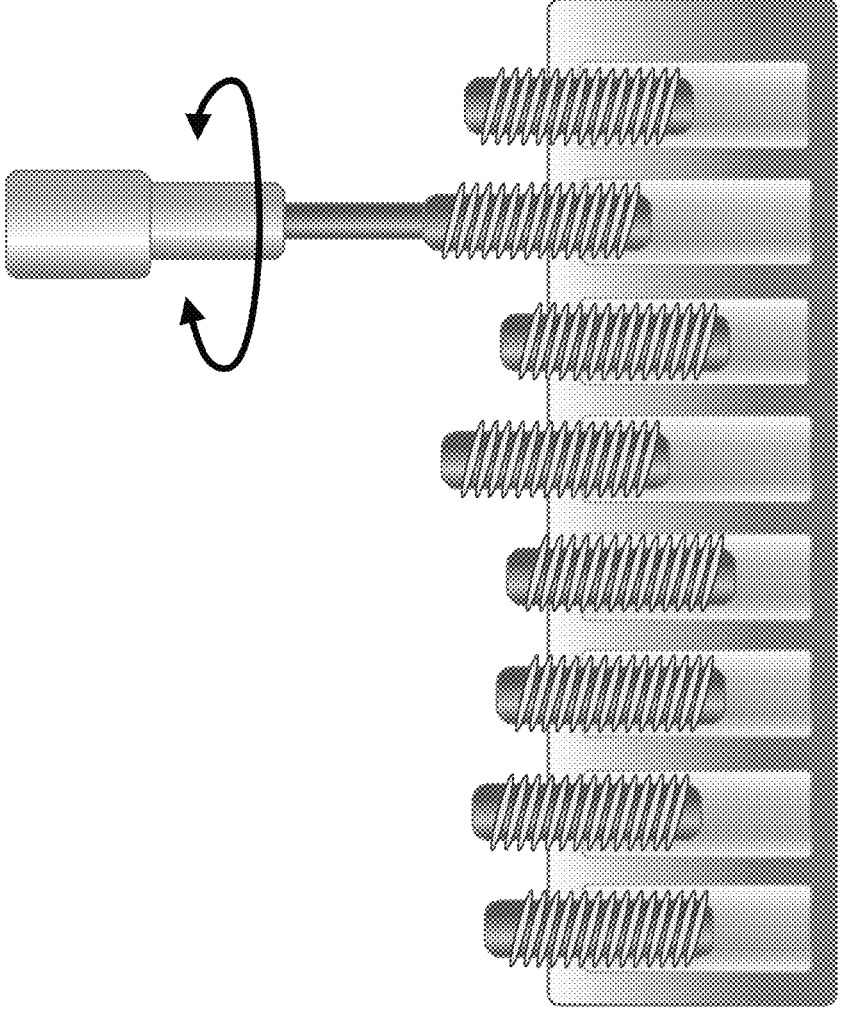
FIG. 6 shows a set of tuning screws set to the average optimally tuned position.

For the mean reference parameter set, meanPar, shown in FIG. 6, the robot has set all the tuning screws to their average depth into the tuning cavity for an average set of duplexers that have been optimally tuned.

One should note that the three reference parameter sets do not have to comprise the same three position sets described above. Other sets of positions may be chosen depending on how well they perform for characterization of the cavity filters to the deep learning network. However, the meanPar set has particular interest because it provides the average of all the optimally tuned devices for large numbers of devices, but it can also be a different setting if desired. Further, while the discussion here uses three sets, and more or fewer sets may be used, more than likely, the process will achieve better results with at least three sets.

Figure 7:
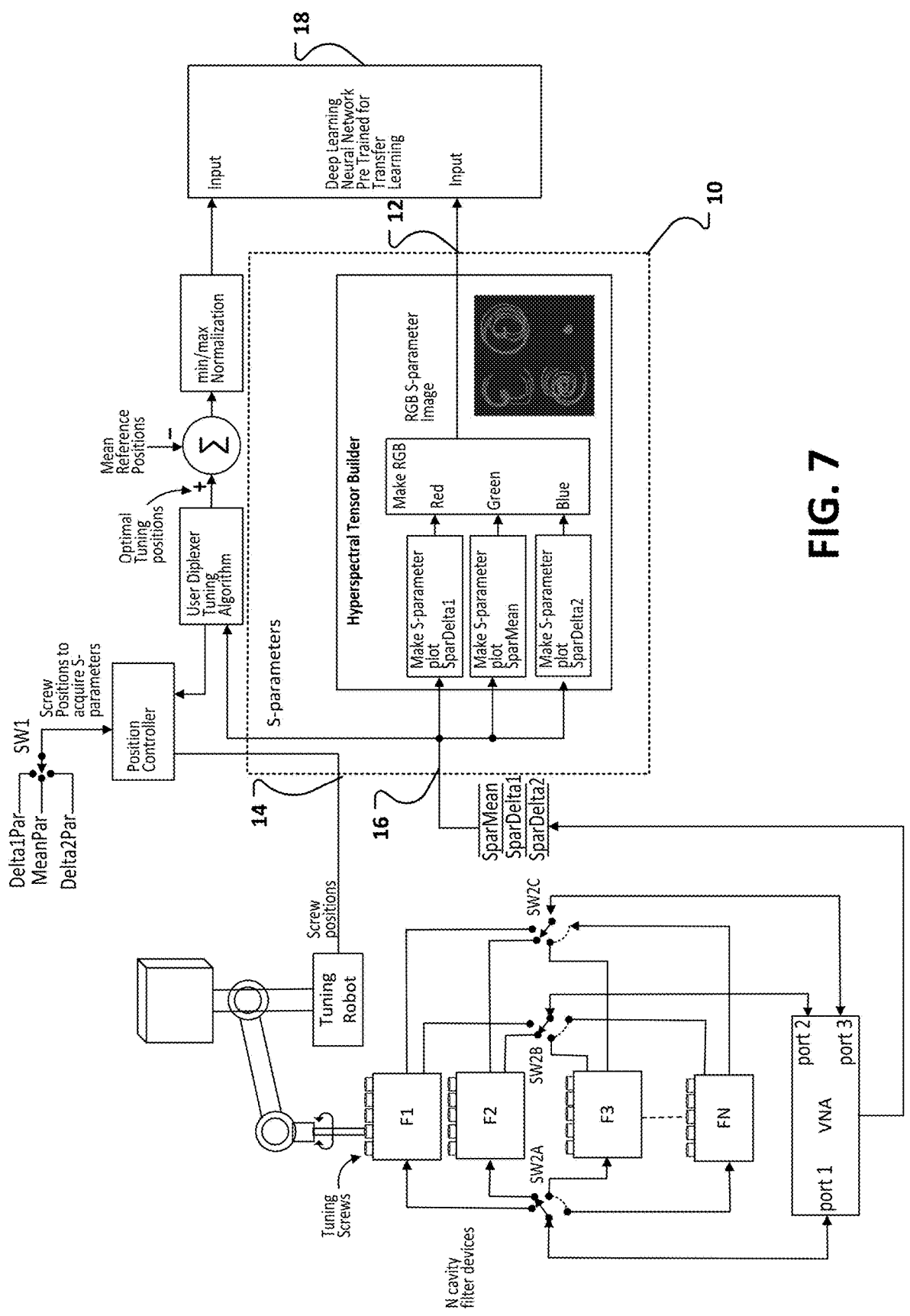
FIG. 7 shows a block diagram of an embodiment of training a machine learning system for robot-controlled tuning of cavity filters.

FIG. 7 shows an embodiment of a system and method to train the deep learning network to associate a DUT set of S-parameters in order to predict an optimal tuning set of screw positions for the duplexer, diplexer, cavity filter, or similar cavity-tunable DUT. The example here uses a duplexer. S-parameters, or scattering parameters, describe the input-output relationships between ports in an electrical system. S11 is the input port voltage reflection coefficient, S12 is the reverse voltage gain, S21 is the forward voltage gain, and S22 is the output port voltage reflection coefficient, S32 is the far-end cross talk. One should note that the use of S-parameters provides one example of operational parameters. Other examples include S-parameters in the time domain, Z-parameters (open circuit or impedance parameters), H-parameters (hybrid parameters), X-parameters (generalization of S-parameters), and many others.

Figure 9:
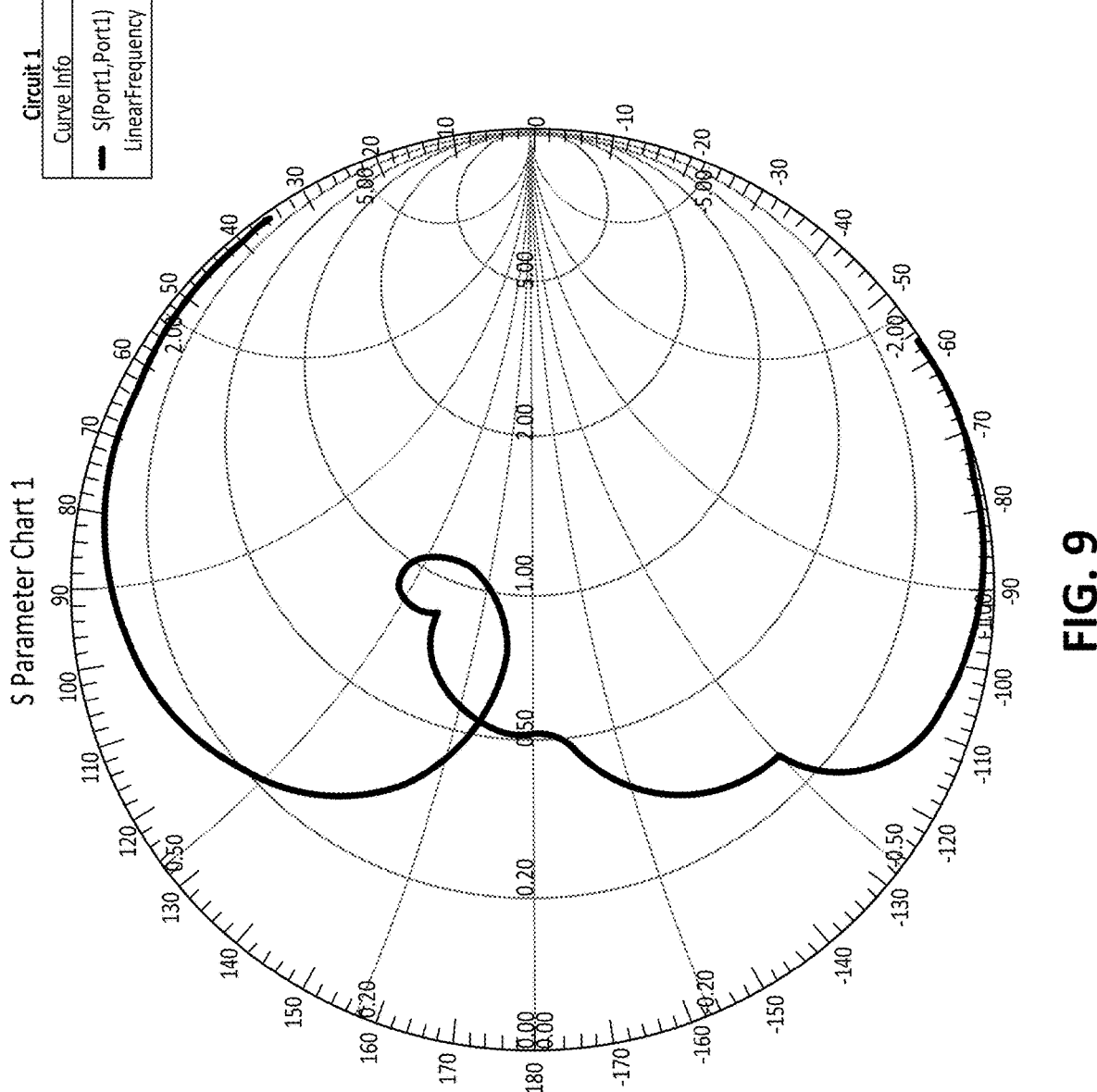
FIGS. 9-11 show Smith chart views of S-parameters of a duplexer.
Figure 10:
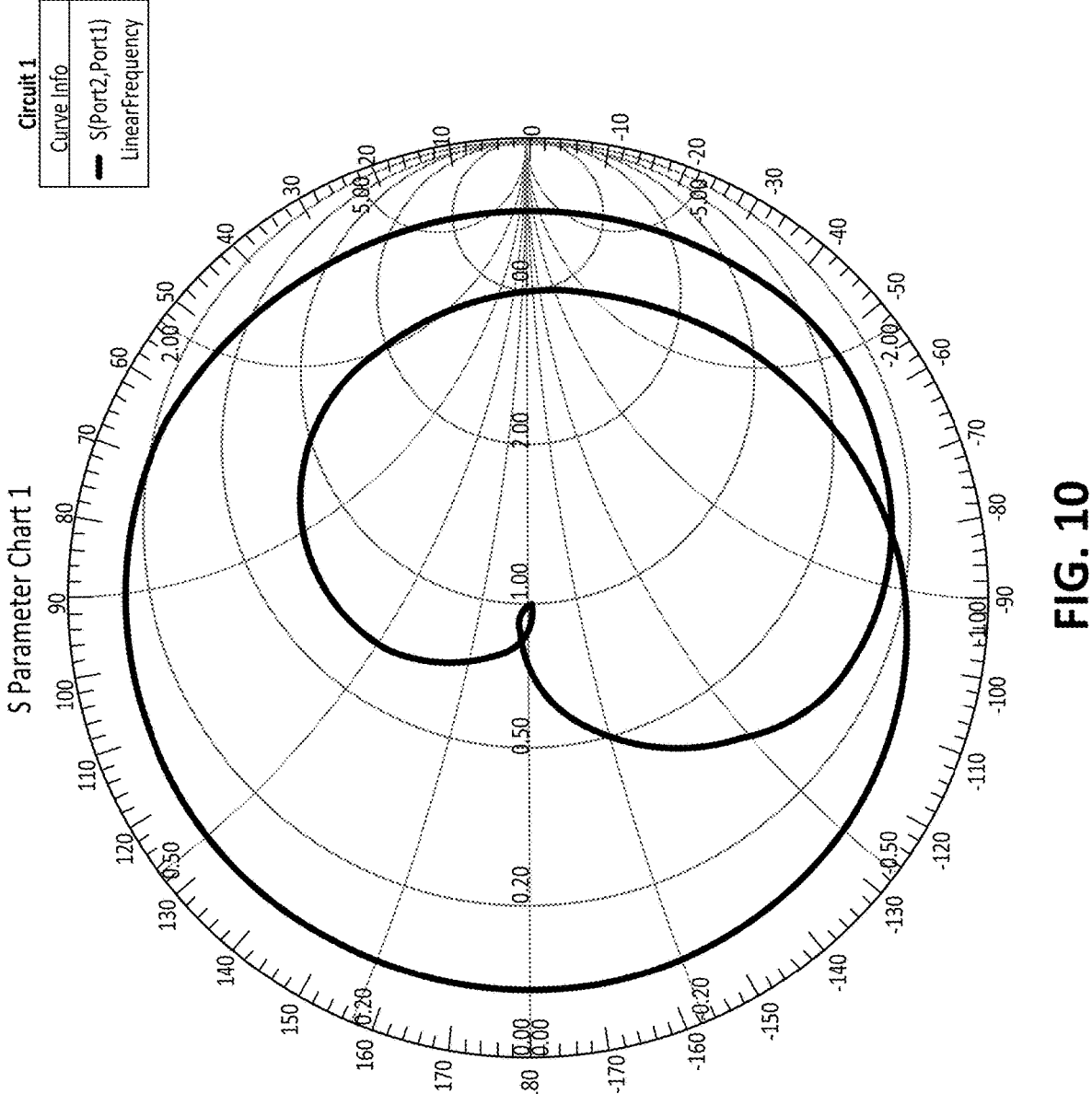
Figure 11:
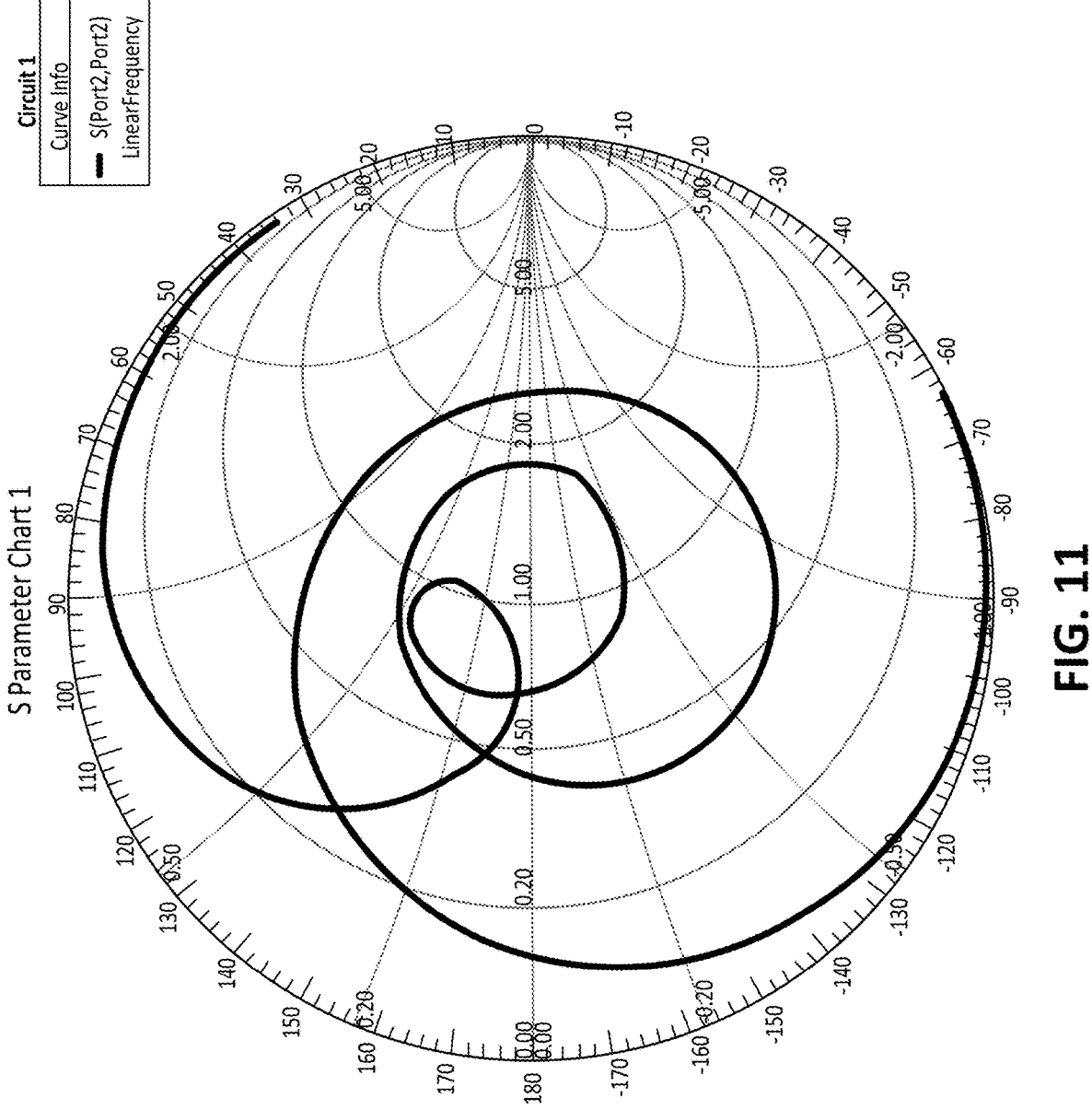

One should note that the embodiments do not need to use all the S-parameters in the 3-port set as input for training the deep learning network. The duplexer is a passive device where physics dictates, S31=S13, and S21=S12. In addition, the cross-coupling terms of S32=S23. Therefore, when the tensor images are created, only S21, S11, S22, S32, and S33 may be incorporated into the tensor image for training, discussed below. An XY real vs imaginary (RI) chart representation of each parameter is shown in FIG. 9, FIG. 10, and FIG. 11. Other types of plots could be used, such as magnitude and phase (MP), which may be preferred for insertion and crosstalk terms, and impedance (Z) plots vs reflection coefficient (S11) plots. The S32 Smith chart is not shown but would be used in this procedure.

FIG. 7 shows a test and measurement instrument that can implement a procedure for training a machine learning system 18 to be used for duplexer tuning, as an embodiment of a method to tune tunable cavity DUTs. Instrument 10 has ports 12 and 14, port 12 to allow the instrument to communicate with a deep learning neural network, and port 14 to communicate with a robot that can receive commands from the instrument to tune the cavity on the device. Port 16 receives the S-parameters from the VNA and sends the S-parameter RGB image through port 12 to the machine learning system.

The training process uses a large number of DUTs for training purposes, and uses the instrument and the robot, and the user's conventional manual or non-manual tuning procedure, to tune each device and record the position of the screws for the optimal tuning. The screw positions for the optimal tuning make up the optimal tuning parameter set for each individual duplexer. The instrument may comprise a Vector Network Analyzer (VNA), such as the Tektronix TTR506A Vector Network Analyzer. This particular example has three-port VNA which may measure S21, S11, S22, S32, and S33 on the three port filter networks. The instrument may use some external switches to make the appropriate connections for each measurement.

Once the instrument has the optimal parameter set for each DUT, one or more processors in the instrument may execute code to cause the one or more processors to perform the methods of the embodiments. In this instance, the one or more processors would compute the mean for each parameter, meaning each tuning screw position, of all the optimal tuning sets to obtain the meanPar reference parameter set. While the embodiments here show the machine learning system 18 to be separate from the instrument for ease of discussion, no such limitation exists. The instrument may include any or all the machine learning system, the normalization and denormalization blocks, and the position controller that controls the robot.

In one embodiment the process then defines three sets of reference position parameters. This discussion will refer to these as delta1Par, delta2Par, and meanPar, as discussed above. The instrument then sends commands to the robot to position the tuning screws to the delta1Par position and acquires a first set of 3-port S-parameters for the DUTs. The instrument then sends commands to the robot to position the screws to the delta2Par reference position and acquires a second set of 3-port S-parameters for the DUT. In this embodiment, the instrument then sends one last set of commands to the robot to position the screws to the meanPar reference position and acquires a third set of 3-port S-parameters for the duplexer.

Once the instrument has the three sets of reference S-parameters, it generates a parameter image of an S-parameter plot. In one embodiment, as discussed above, this comprises the XY real vs imaginary plot for the S-parameters. Imaginary values of the S-parameters are on the vertical axis, and the real part of the S-parameters are on the X-axis. FIGS. 9-11 show Smith chart plots for the S11, S22, and S21 parameters, discussed in more detail later. One embodiment uses four of the S-parameters listed above, but the system could use more or fewer S-parameters.

Generation of a combined image, in one embodiment of a tensor image, involves placing one XY plot of each of the S-parameters into one quadrant of the image. Using four S-parameters results in each quadrant having an image. In other embodiments, these plots could be arranged in different ways. Each parameter set ends up with its own image, with each parameter extracted from the parameter set in a different quadrant of the image. These images then combine to form a combined image. In one embodiment, each parameter set image is placed onto a different color channel of an RGB image. In this embodiment, the parameter image for delta1Par into the red channel, the parameter image for delta2Par into the blue channel, and the meanPar image into the green channel. The process then creates an array of such RGB images, with one RGB image for each duplexer.

Prior to training, the data is normalized. In one embodiment, this involves subtracting the meanPar data set from the optimal tuning parameter data set for each transmitter. The process then uses min/max normalization to scale the metadata sets to be with a range of 0.9 to −0.9. This places the data into a range of neural net layers that have compression as the data approaches one or −1. The results are then placed into an array. The index of metadata optimal tuning set shall correspond to the index in the array of position vectors for the corresponding three sets of RGB S-parameters representing the characterization of the transmitter for that optimal tuning.

The process then uses the array of metadata and the array of S-parameters to train the machine learning system.

Figure 8:
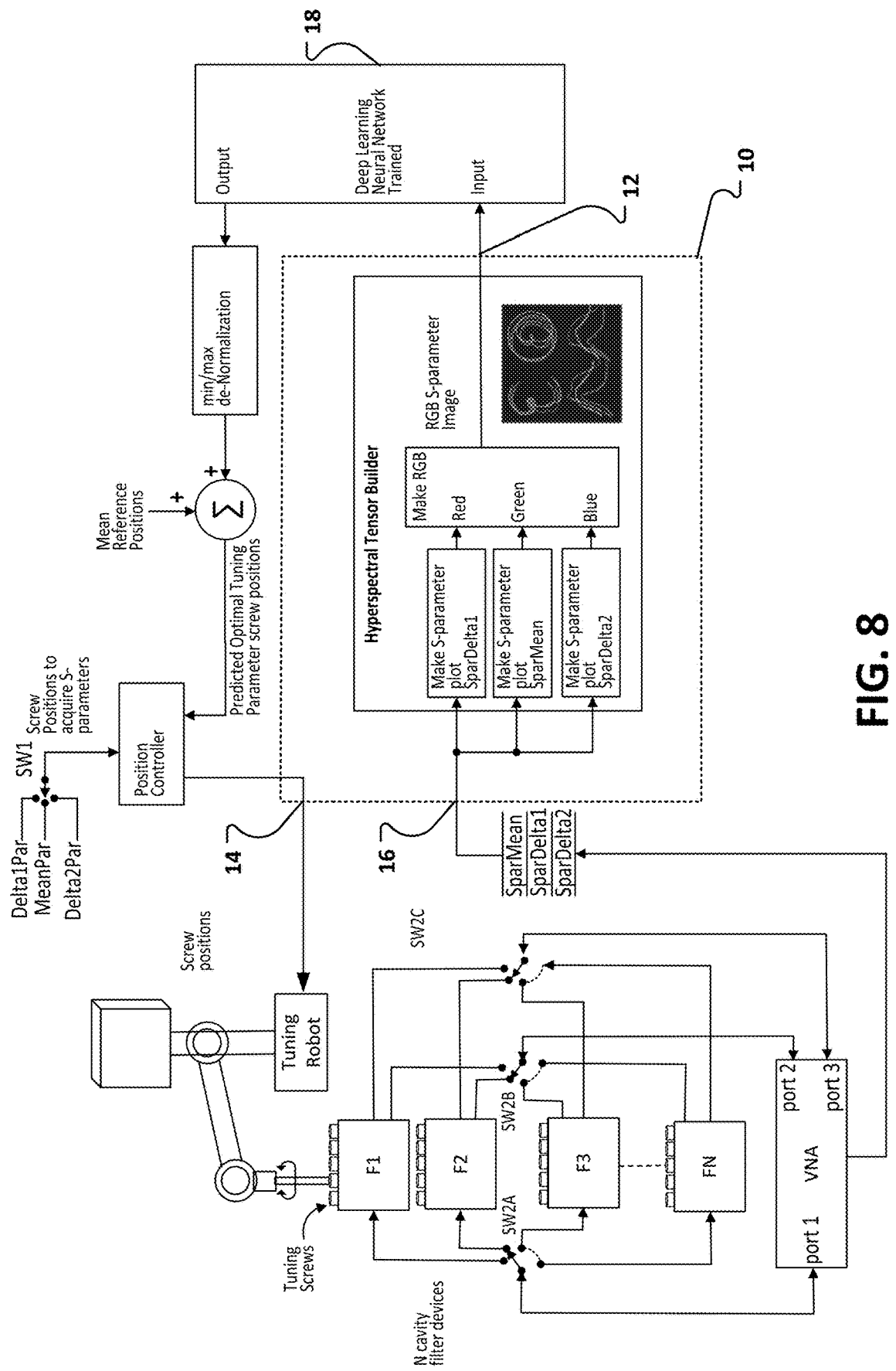
FIG. 8 shows a block diagram of an embodiment of using a machine learning system for runtime robot-controlled tuning of cavity filters.

After the deep learning network has been trained, it is then ready to use on the manufacturing line to receive reference position S-parameters from the device to tune, and then make a prediction on what the screw positions shall be for optimal tuning for that transmitter. The robot then rotates the screws to the optimal predicted tuning position. FIG. 8 shows an embodiment of this process.

The process begins by connecting the DUT to be tuned to the test and measurement instrument, such as a 3-port VNA. The instrument then sends commands to position the screws to one or more sets of positions, wherein each set of positions make up a parameter set for the tuning screws. As in the above discussion, this discussion will also use three parameter sets.

The instrument sends commands to the robot to position the screws to delta1Par position and then acquires the operational parameters, e.g., S-parameters, for that set. The instrument then sends commands to the robot to position the screws to the meanPar positions and acquires the operational parameters for that set of parameters. Finally, the instrument will send the commands to the robot to position the screws to delta2Par position and acquires the operational parameter set for those settings.

Once the operational parameter sets are acquired, the instrument can make up the RGB image using the same procedure as in training, by generating parameter images and then combining them into one image. These are then placed onto the channels of an RGB image by combining the parameter images for the delta1Par S-parameters used into the quadrants of one image and placing them on the red channel, combining the parameter images for the meanPar S-parameters into the quadrants of one image and placing it in the green channel of the RGB image, then combining the delta2Par S-parameters into quadrants of one image and placing it in the blue channel of the RGB image.

The instrument then sends the RGB image to the trained machine learning system to obtain a set of predicted values. As discussed previously, the data provided to the machine learning system may be normalized, so the results need to be de-normalized. The denormalized data is then added to the meanPar tuning parameter set. This should set the DUT to its proper operating settings to tune the DUT. The instrument then sends commands to the robot to set the tuning screws to the positions predicted by the result of the previous step. The operation of the DUT is then validated.

Figure 1:
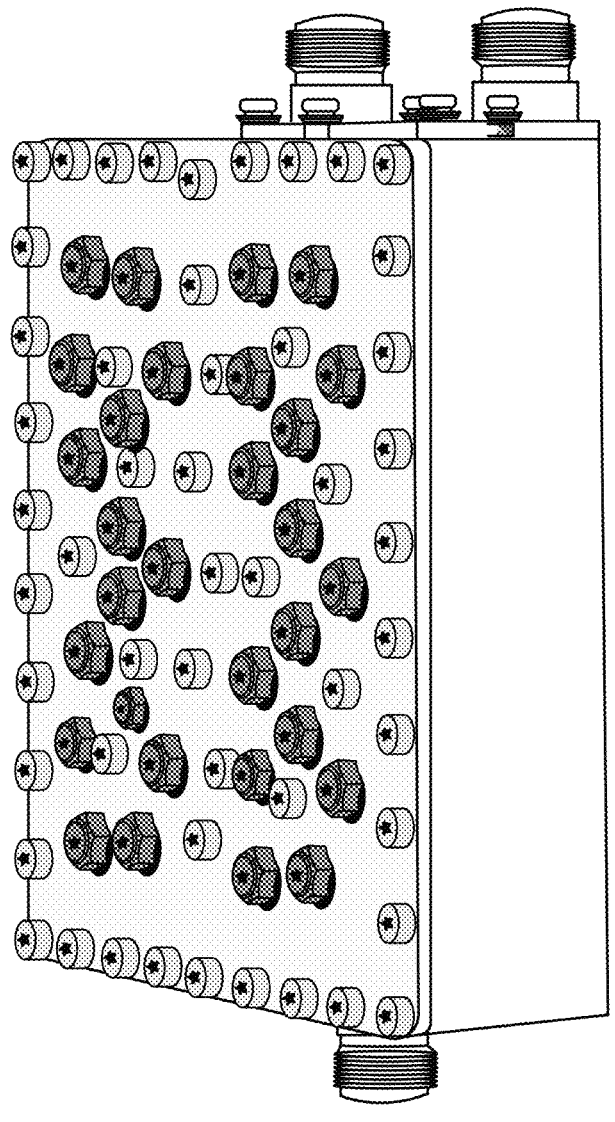
FIG. 1 shows an example of a duplexer having tuning screws.
Figure 2:
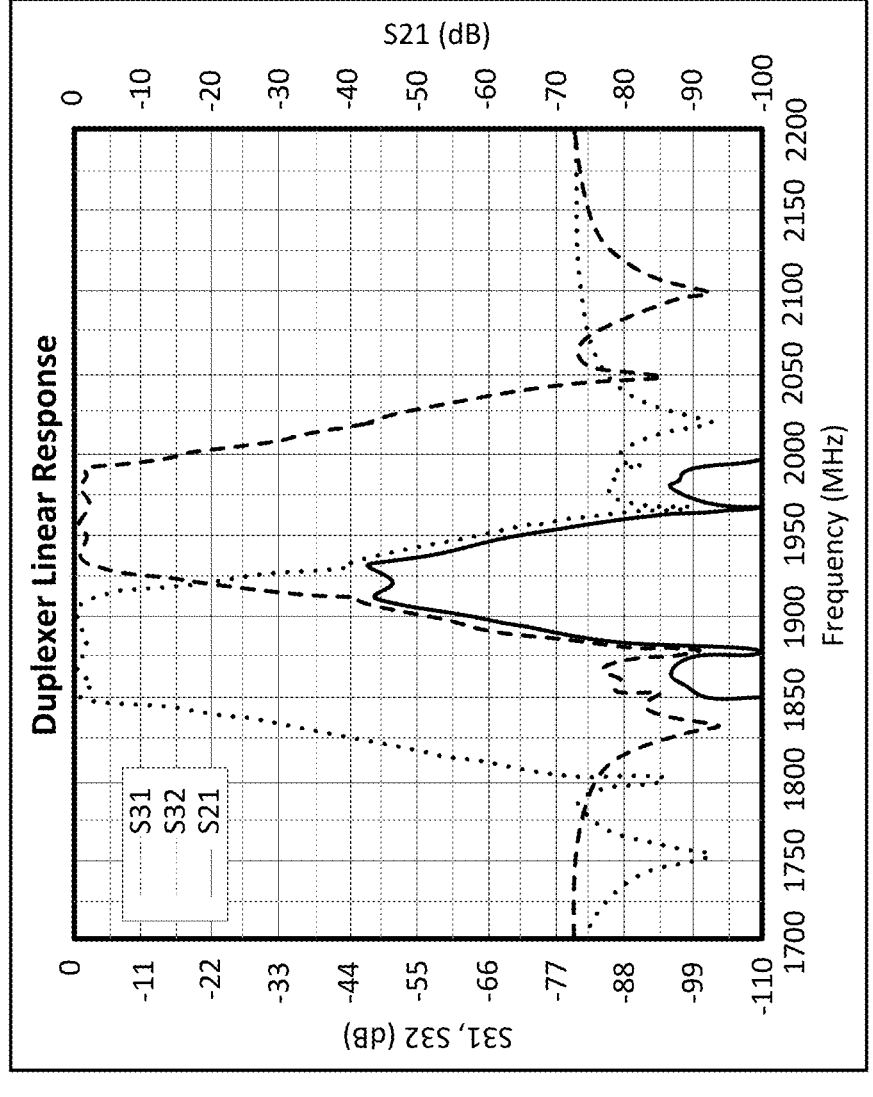
FIG. 2 shows an example plot of the two bandpass responses of a duplexer.
Figure 3:
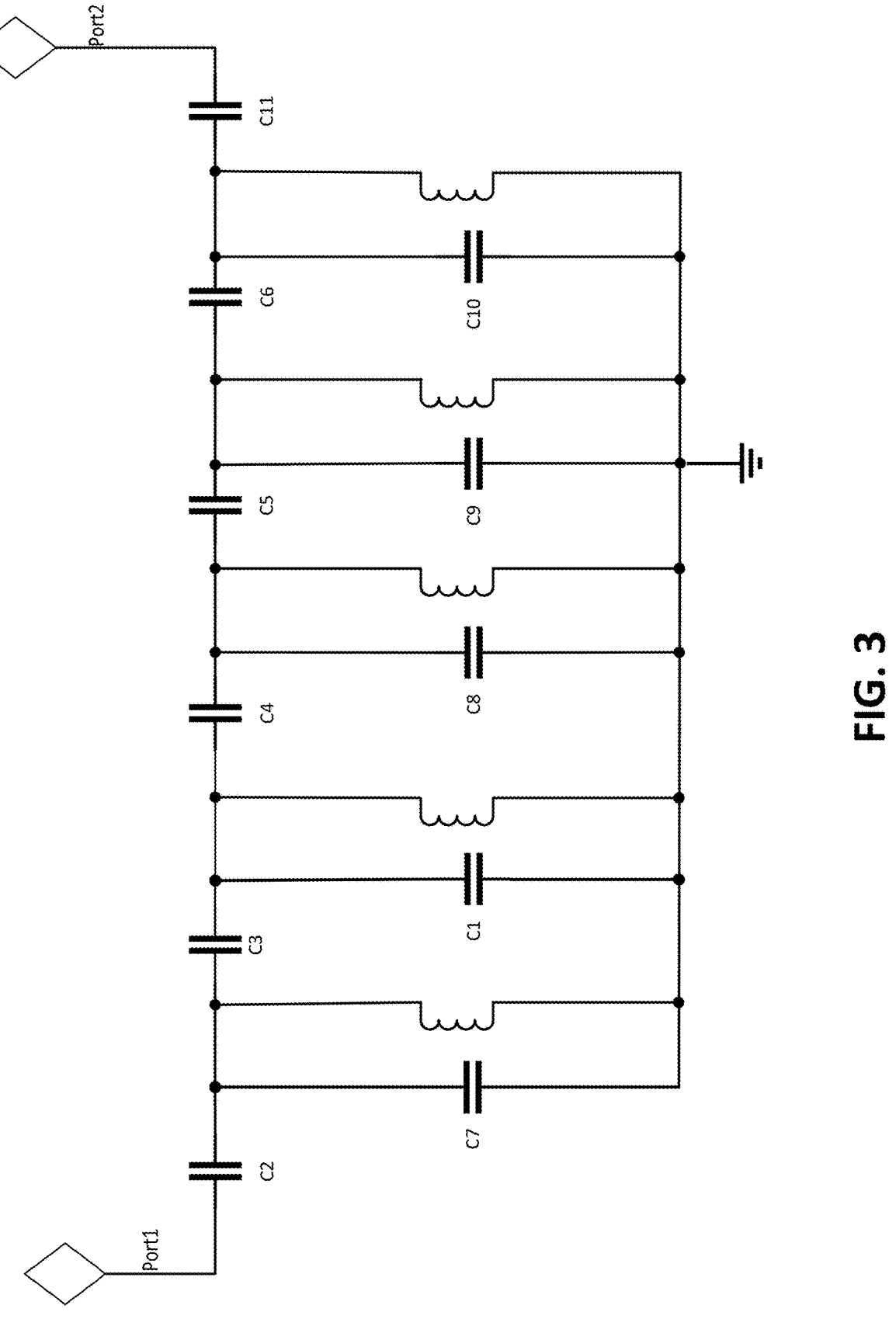
FIG. 3 shows an example of a circuit diagram for half of a duplexer.

FIGS. 9-11 show Smith chart plots for S11, S22, and S21 of the simulated half of a duplexer circuit as shown in FIG. 3. The Smith chart is created by simply plotting an S-parameter set of real and imaginary values on an XY axis and then drawing the Smith chart grid for it. The image tensors for input to the deep learning network do not include the Smith chart grids, but only the XY plot of the S-parameter data. One should note that in practice a fourth plot for S32 would also be incorporated. In addition, the process may incorporate S33 and S31.

Figure 12:
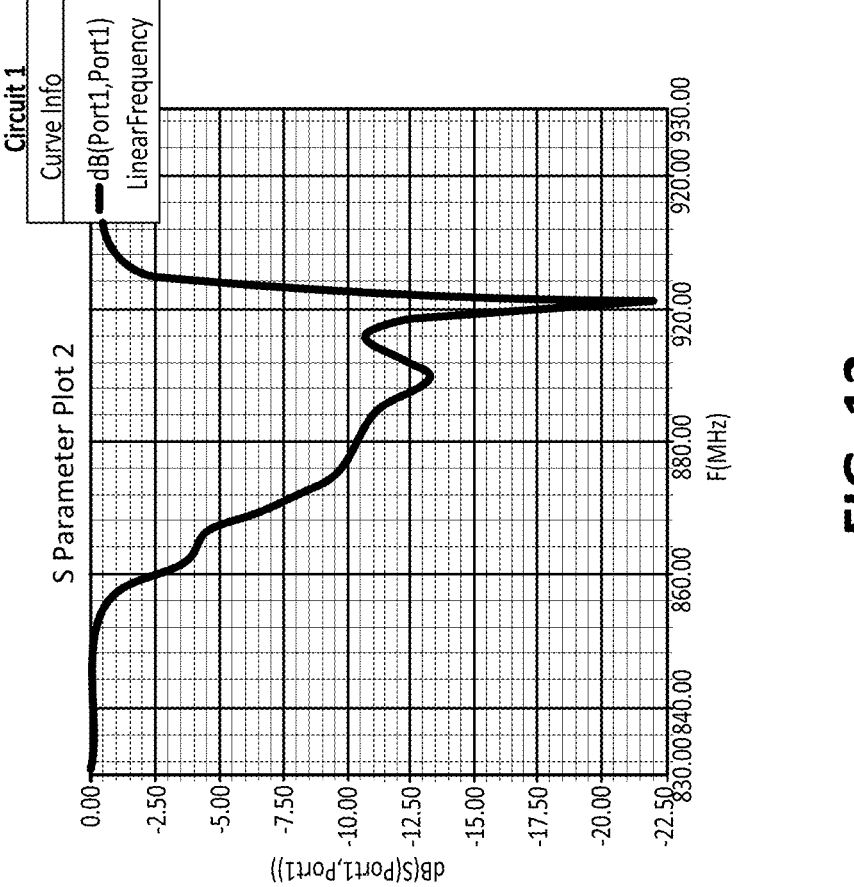
FIGS. 12-14 show magnitude versus frequency plots for S-parameters of a duplexer.
Figure 13:
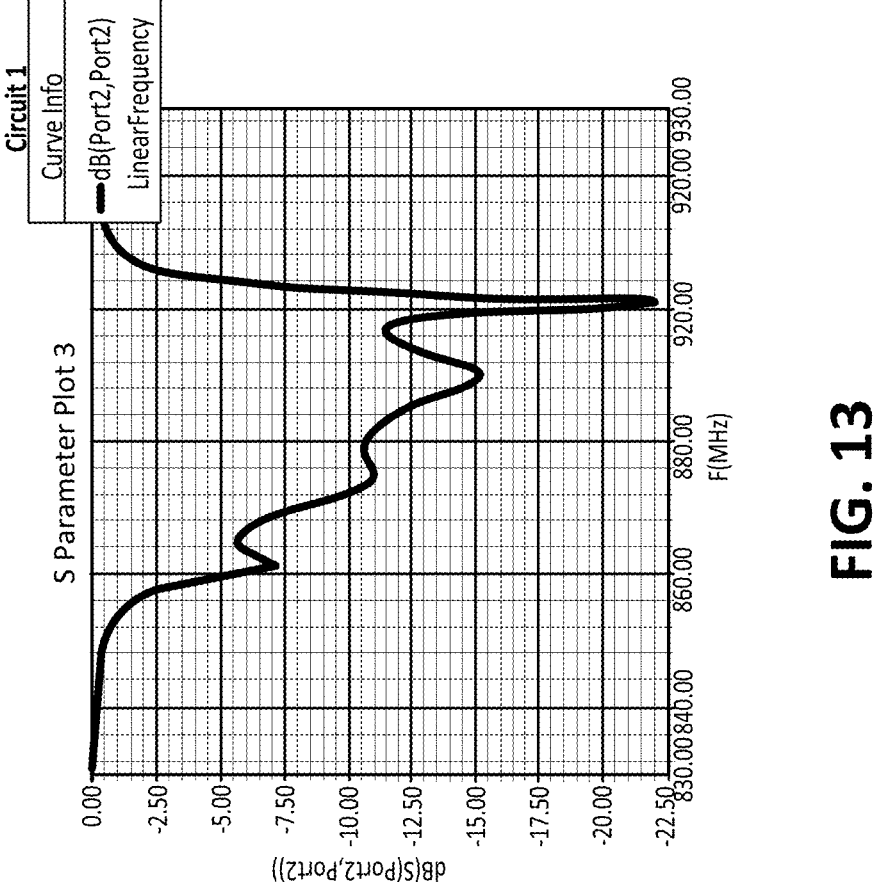
Figure 14:
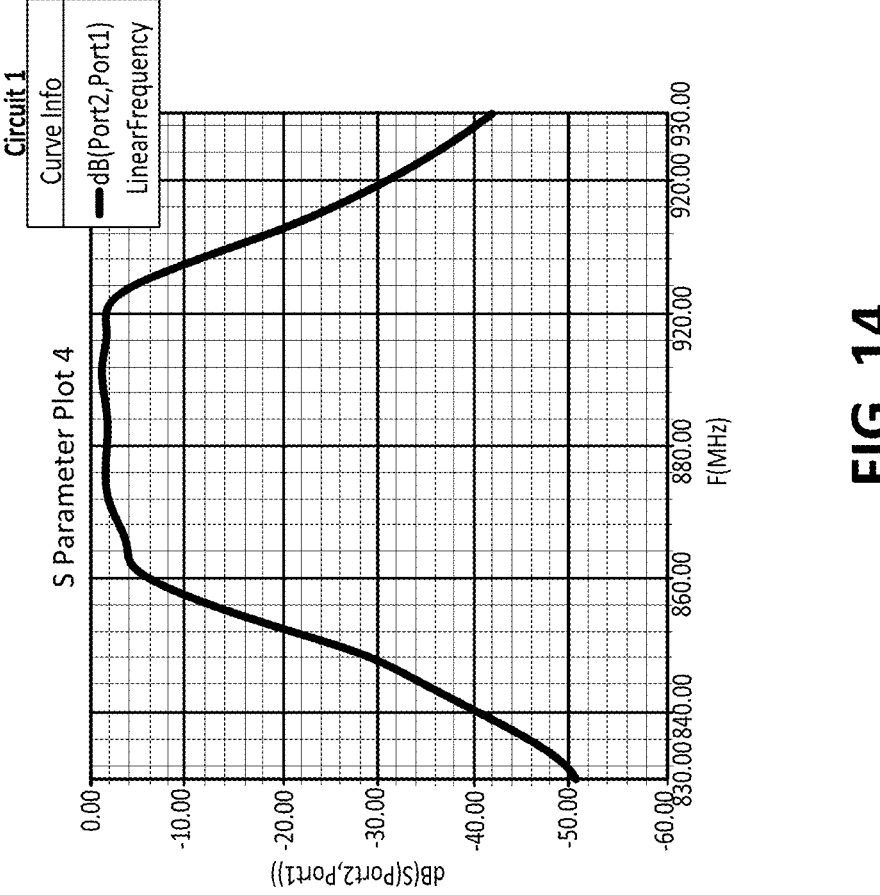

FIGS. 12-14 show log plots for magnitude vs frequency. According to some embodiments of the disclosure, it is also possible to use these plots to create the tensor images to use for input to the deep learning network, rather than the Smith chart plots. For this approach, the phase plot of each S-parameter would also be incorporated and overlaid with the magnitude vs frequency plot.

Figure 15:
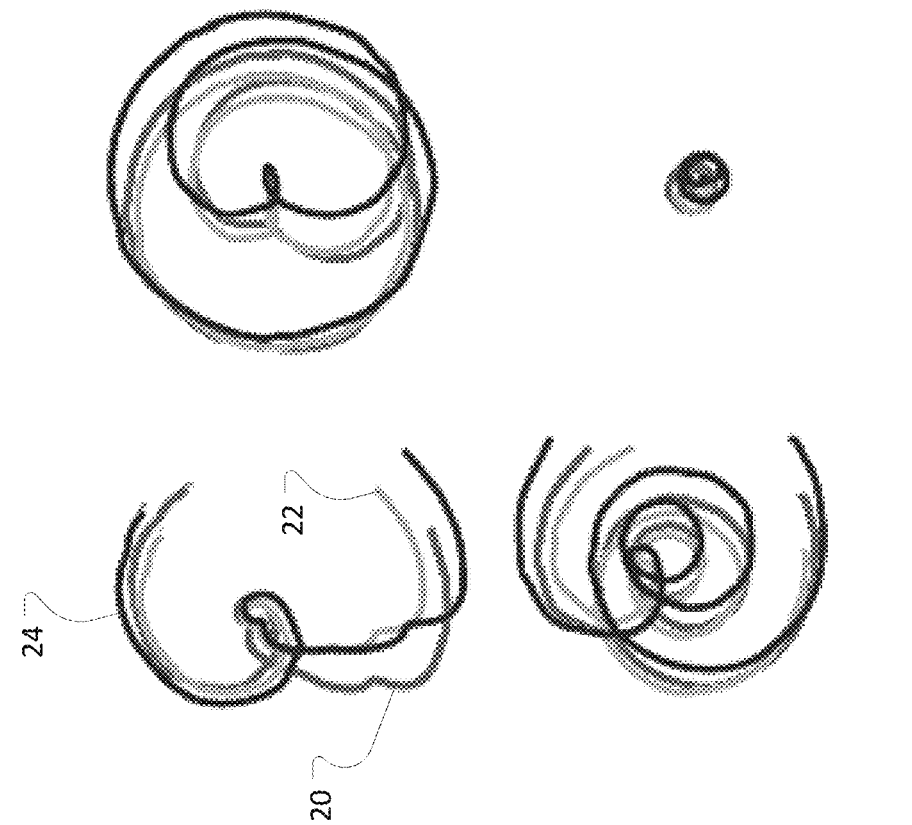
FIGS. 15-16 show examples of RGB tensor images.

FIG. 15 shows an example of the RGB image that would be input to the deep learning network for the purpose of training the network and for the purpose of making a tuning screw position prediction. In one embodiment, the red channel 20 contains the four S-parameters, S11, S22, S21, and S31 that were measured when the robot had set the tuning screws to the delta1Par reference parameter position. The green channel 22 contains the S-parameters, S11, S22, S21, and S31 that were measured when the robot positions the tuning screws to the meanPar reference position. The blue channel 24 contains the S-parameters S11, S22, S21, and S31 when the tuning screws were positioned to the delta2Par position. Other embodiments may use different ordering of the S-parameters for each of the reference parameter sets into whichever of the red, green, and blue channels in constructing the tensor image. Again, one should note that these examples do not include S32 with the assumption it is a small value, and that it is not needed to predict the desired tuning screw positions, but it could be included as well.

Each of the four S-parameters appears in one of the four quadrants of the image. Showing RI, real and imaginary, on all four S-parameters in FIG. 15 leaves the Z-axis which represents frequency coming straight out of the plots. The frequency on the Z-axis is represented as intensity in the image.

Figure 16:

However, an alternative tensor image construction would be to plot S21 as log magnitude vs frequency plot while leaving the reflection coefficients S11, and S22 and S33 as RI plots to show impedance. FIG. 16 shows an example of this tensor image construction. These ports need to be matched to the impedance of the antenna or transmitter to which they are connected.

Figure 17:
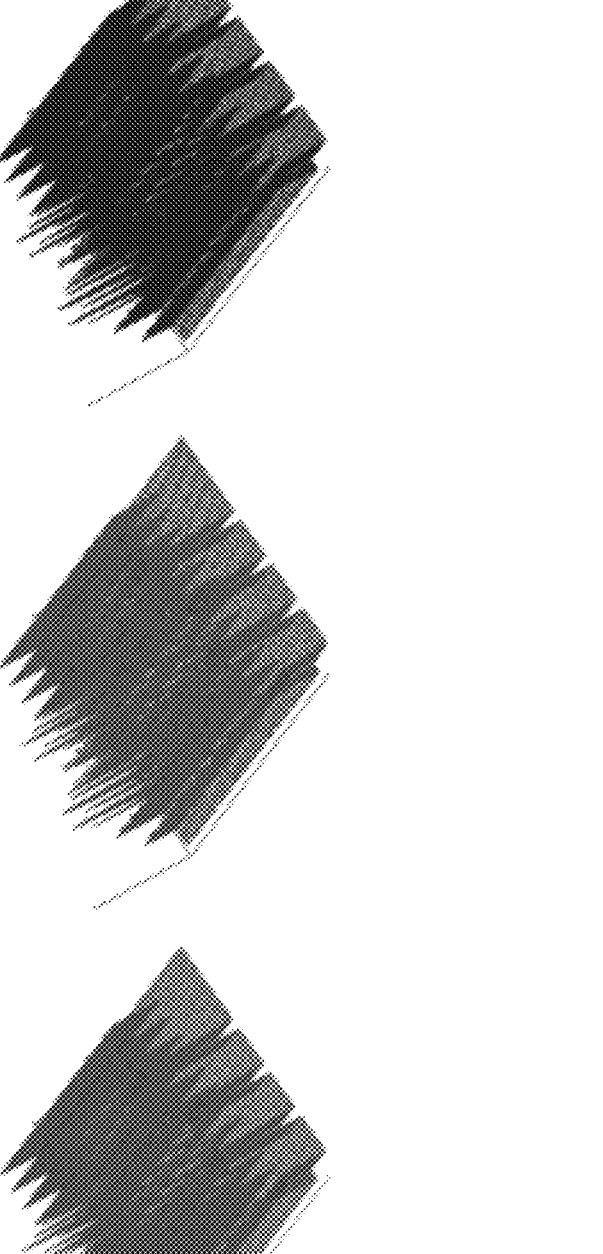
FIG. 17 shows an alternative example of tensor images.

FIG. 17 shows another example of a combined image, also a tensor image, but in which the frequency lies on the image X-axis, amplitude on the Z-axis, and each real and imaginary S-parameter component appearing on the Y-axis. Each of these parameter set images is then placed in a different color channel of the combined RGB image to be analyzed by the deep learning network.

The deep learning network may consist of any type of layered model that can be made to function with the accuracy desired in this system. One example implementation, according to some embodiments of the disclosure, uses a pretrained deep learning network and reconfigure it to use transfer learning. For example, a Resnet18 network which is pre trained to recognize 244×244 pixel RGB images of cats, dogs, keyboards, etc. may be used. The three output layers called fully connected, RELU, and classification are removed and replaced with an untrained fully connected layer, and an output regression layer.

In this example implementation, the many layers of the network are not retrained. Only the two new layers are trained by providing an array of S-parameter tensor images, and an array of metadata vectors representing the optimally tuned positions of the screws for each associated RGB S-parameter image.

Alternative embodiments of the disclosure may convert the S-parameter data to the time domain and use the resulting images as input to the three RGB channels of the constructed tensor images for training and prediction. Then time domain instruments, such as an oscilloscope coupled to a step generator and appropriate fixture routing of signals to the device to be measured, may directly measure the representation of the S-parameters, rather than the VNA shown in FIGS. 7-8.

Figure 18:
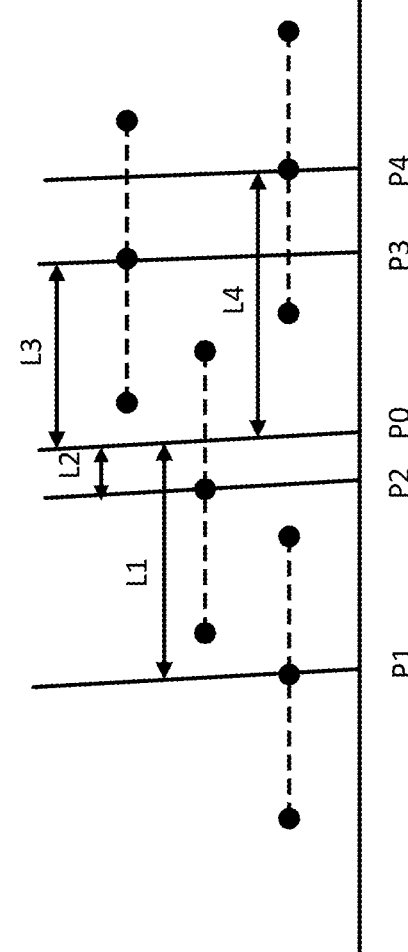
FIG. 18 shows a diagram of integrating four sets of three reference parameters for training a machine learning system.

According to another aspect of the embodiments, for similar precision electromechanical filter devices, the process may use fewer units to produce the necessary training data by collecting data at various reference parameter settings, meaning the tuning screw positions. Instead of using just one triplet set of reference parameters, many sets of triplet reference parameters on the same device may increase the number of data input samples for training for a given number of devices. FIG. 18 illustrates the use of multiple sets of triplet reference parameters.

FIG. 18 shows four sets of data in the diagram, with the center or mean of each set denoted as P1, P2, P3, and P4. Each set has three screw locations as discussed above, such as high, center, and low. The robot moves the screws to various locations to get multiple sets of data. The distance to the optimal location, for example the difference between the center of each triplet data set and the optimal location, makes the label for each of the data sets. FIG. 18 denotes these differences as L1, L2, L3, and L4. These differences provide the metadata input used for training the network. During runtime, the network predicts this data.

This technique allows for the use of fewer filter units to get large data sets for training. However, a need still exists to use enough samples of filter units to let the machine learning model observe the variation between units. For the same number of units used for training, the system obtains more data for machine learning model training, which improves the accuracy of the model.

Figure 19:
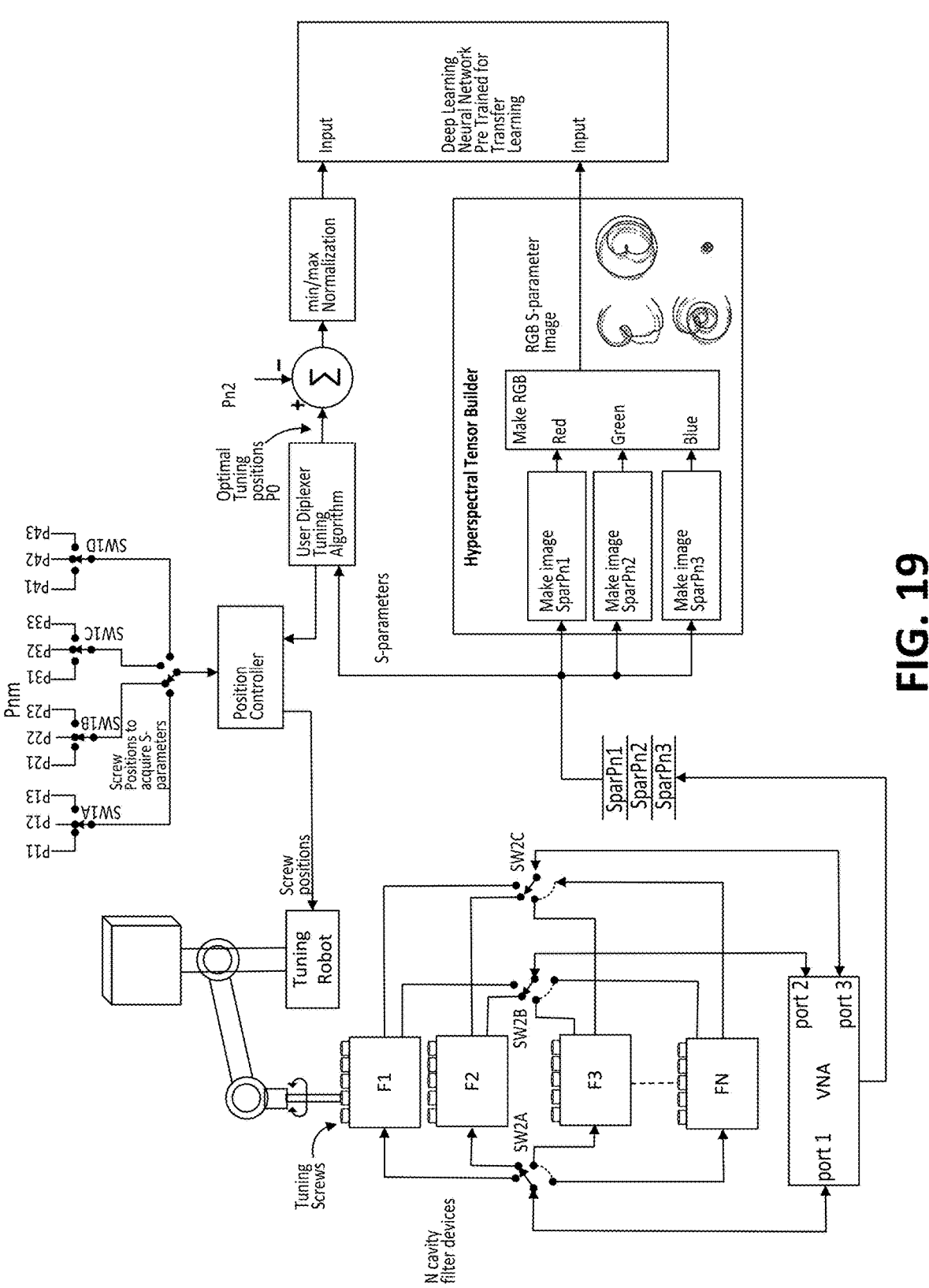
FIG. 19 shows a block diagram of an embodiment of training a machine learning system for robot-controlled tuning of cavity filters using four sets of three position sets.

The metadata into the deep learning network would be defined as follows:

$$L = P0 - Pn2$$

where P0 is the optimally tuned screw position, and where Pn2 is the middle set of screw positions out of the three reference parameter sets used. Then L is the set of differences that are input to the deep learning network when it is trained. FIG. 19 shows a training system using four sets of three position sets for training the deep learning network.

Figure 20:
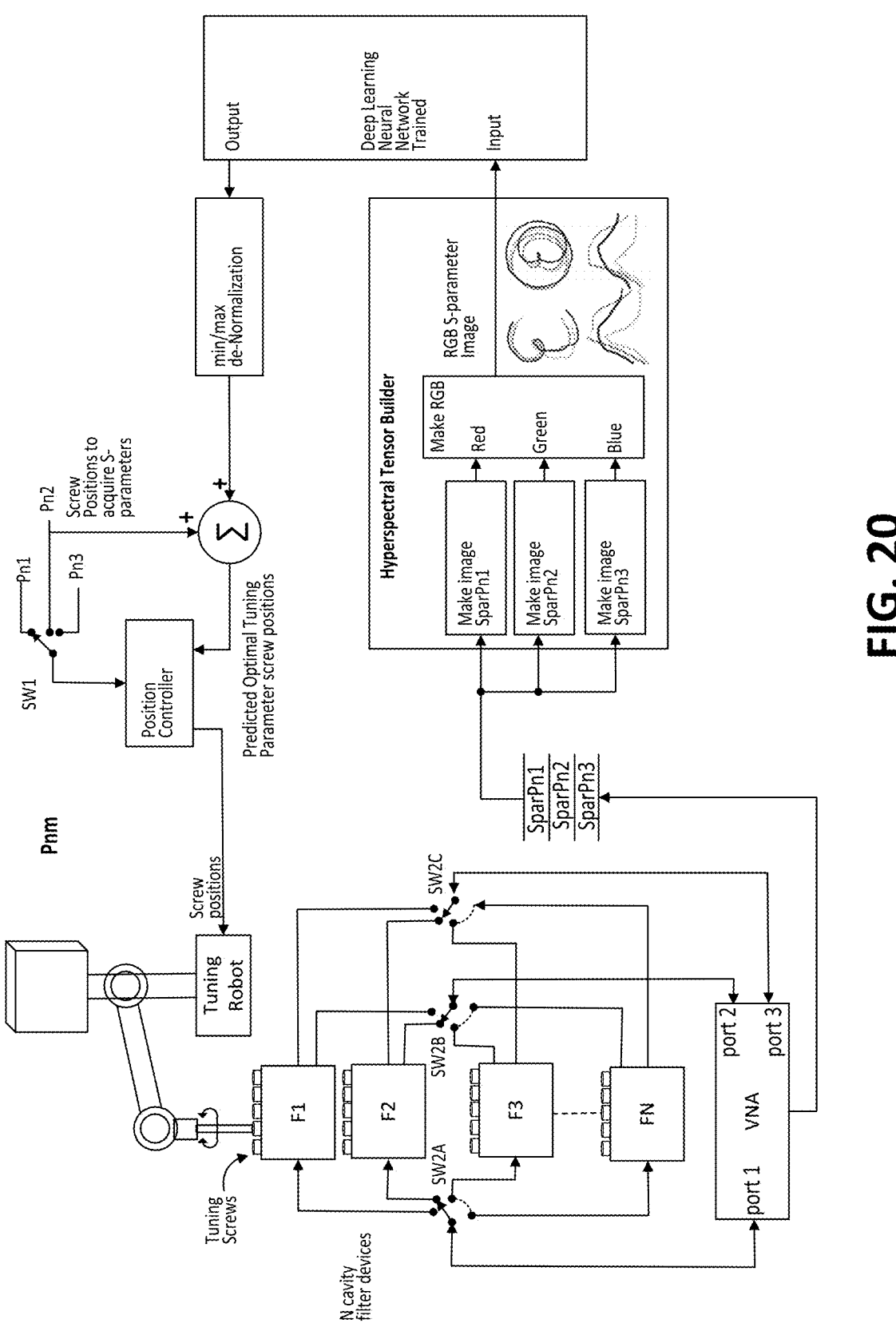
FIG. 20 shows a block diagram of an embodiment of using a machine learning system for runtime robot-controlled tuning of cavity filters using four sets of three position sets.

Then during run time, the three reference screw position parameter sets are used to measure the filter device S-parameters and make an RGB image to input to the deep learning network which makes a prediction for L after the de-normalization block, as shown in FIG. 20. Then the actual screw positions are computed as:

$$P0 = L + Pn2$$

The system shown in FIG. 20 represents the trained system in runtime for prediction of optimal screw positions to optimally tune the filter.

To make a prediction, the process chooses one of the four possible triplet sets of positions. The process then feeds the screw position for each of the reference position triplet set to the robot to set the positions. The test and measurement device then measures the 3-port S-parameter set for each of the three reference sets. The process then makes the three images as described for training and placed in each of the RGB channels. The deep learning network then receives the RGB image, and it provides the prediction for screw position for the optimal tuning of the filter.

Embodiments of the disclosure provide a novel system for tuning the set screws for diplexers and duplexers and other devices with tuning screws, using reference parameter settings and machine learning to predict the optimal settings for the tuning screws. This is accomplished by collecting a set of reference parameters for many cavity filter device samples that are set to three reference parameter screw position settings. Then training the neural network to associate those three reference-parameter sets from the device when it is tuned to the optimal screw position settings to obtain the calibrated desired S-parameters. Thus, the trained deep learning network observes a tensor image containing the S-parameters of the device from the three reference position screw settings, and then predicting what the optimal tuned screw positions are. In addition, a novel approach is taken to increase the number of reference parameter triplet sets to any number desired. This allows for a much larger number of training data inputs for a given number of devices. This latter approach will work well for devices that are precision and do not show much variation from device to device. Embodiments may be used to automatically tune any device having tuning elements in which the physical position of the tuning elements affects the measured S-parameters of the device.

Aspects of the disclosure may operate on a particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description refers to particular features. It is to be understood that the disclosure in this specification includes all possible combinations of those particular features. For example, where a particular feature is disclosed in the context of a particular aspect, that feature can also be used, to the extent possible, in the context of other aspects.

The previously described versions of the disclosed subject matter have many advantages that were either described or would be apparent to a person of ordinary skill. Even so, these advantages or features are not required in all versions of the disclosed apparatus, systems, or methods.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example 1 is a test and measurement instrument, comprising: one or more ports to connect to one or more devices under test (DUT) having tuning screws, and to a robot; and one or more processors configured to execute code, the code to cause the one or more processors to: send commands to the robot to position the tuning screws on the one or more DUTs to one or more sets of positions, each set of positions comprises a parameter set for the tuning screws; acquire a set of operating parameters for each parameter set from the one or more DUTs; generate a parameter set image for each set of operating parameters; create a combined image of the parameter set images; provide the combined image to a machine learning system to obtain a predicted set of values; adjust the predicted set of values as needed to produce a set of predicted positions; send commands to the robot to position the tuning screws on the one or more DUTs to positions in the set of predicted positions; obtain a set of tuned operating parameters from the one or more DUTs; and validate operation of the one or more DUTs based upon the tuned operating parameters.

Example 2 is the test and measurement instrument as claimed in claim 1, wherein the parameter sets comprise at least three parameter sets.

Example 3 is the test and measurement instrument of either Examples 1 or 2, wherein the operating parameters comprise one of S-parameters, S-parameters in the time domain, H-parameters, Z-parameters, or X-parameters.

Example 4 is the test and measurement instrument of any of Examples 1 through 3, wherein the code to cause the one or more processors to send commands to the robot to position the tuning screws and acquire sets of operating parameters, comprises code to cause the one or more processors to: send commands to the robot to position the tuning screws to a first set of positions corresponding to a maximum depth position for each screw; acquire a maximum parameter set from the DUT for the maximum depth positions; send commands to the robot to position the tuning screws to a second set of positions corresponding to a minimum depth position for each screw; acquire a minimum parameter set from the DUT for the minimum depth position; send commands to the robot to position the tuning screws to a third set of positions corresponding to an average depth position for each screw; and acquire a mean parameter set from the DUT for the average depth position.

Example 5 is the test and measurement instrument of any of Examples 1 through 4, wherein the code to cause the one or more processors to generate a parameter set image for each set of operating parameters, comprises code to cause the one or more processors to generate an XY plot of the operating parameters, the operating parameters being the S-parameters, and to plot an imaginary portion of the S-parameters on one axis and a real portion of the S-parameters on the other axis.

Example 6 is the test and measurement instrument of any of Examples 1 through 5, wherein the code to cause the one or more processors to generate a parameter set image comprises code to cause the one or more processors to: place different operating parameters extracted from the operating parameter sets into different quadrants of the parameter set images, each parameter set having a corresponding parameter set image; and place the parameter set image for each operating parameter set into different channels of an RGB image to produce the combined image.

Example 7 is the test and measurement instrument of any of Examples 1 through 6, wherein the code to cause the one or more processors to generate a parameter set image comprises code to cause the one or more processors to: create XYZ plots of each operating parameter set, the XYZ plots having the Z-axis as amplitude, the X-axis as frequency, and the Y-axis is a position for each real or imaginary portion of each S-parameter; and place XYZ plots of each operating parameter set onto a different channel of an RGB image.

Example 8 is the test and measurement instrument of any of Examples 1 through 7, wherein the code to cause the one or more processors to adjust the predicted set of values comprises code to cause the one or more processors to: de-normalize the predicted set of values; and add one of the parameter sets to the predicted set of values to produce the predicted set of positions.

Example 9 is the test and measurement instrument of any of Examples 1 through 8, wherein the one or more processors are further configured to execute code to cause the one or more processors to train the machine learning system.

Example 10 is the test and measurement instrument of Example 9, wherein the code to cause the one or more processors to train the machine learning system comprises code to cause the one or more processors to: tune a plurality of devices under test (DUT) having tuning screws to their optimal tuning parameter to produce optimal tuning parameter sets; compute a mean from all the optimal tuning parameter tuning sets to obtain meanPar parameter reference sets; use the robot to position the tuning screws to positions determined by different parameter sets including the mean-Par parameter reference set; for each parameter set acquire operational parameter sets from the plurality of DUTs; create a parameter image for each set of operational parameters; combine the parameter image of all the parameter sets into a combined image to produce an array of combined images, the array comprising combined images for each of the plurality of DUTs; and use the array of combined images to train the machine learning system.

Example 11 is a method of testing a device under test (DUT) having tuning elements, comprising: sending commands to a robot to position tuning elements on the DUT to one or more sets of positions, each set of positions comprises a parameter set for the tuning elements; acquiring a set of operating parameters for each parameter set from the DUT; generating a parameter set image for each set of operating parameters; creating a combined image of the parameter set images; providing the combined image to a machine learning system to obtain a predicted set of values; adjusting the predicted set of values as needed to produce a set of predicted positions; sending commands to the robot to position the tuning elements on the DUT to positions in the set of predicted positions; obtaining a set of tuned operating parameters from the DUT; and validating operation of the DUT based upon the tuned operating parameters.

Example 12 is the method of Example 11, wherein the parameter sets comprise at least three parameter sets.

Example 13 is the method of either Examples 11 or 12, wherein the operating parameters comprise one of S-parameters, S-parameters in the time domain, H-parameters, Z-parameters, or X-parameters.

Example 14 is the method of any of Examples 11 through 13, wherein the tuning elements comprise tuning screws, and wherein sending commands to the robot to position the tuning elements and acquiring sets of operating parameters, comprises: sending commands to the robot to position the tuning screws to a first set of positions corresponding to a maximum depth position for each screw; acquiring a maximum parameter set from the DUT for the maximum depth positions; sending commands to the robot to position the tuning screws to a second set of positions corresponding to a minimum depth position for each screw; acquiring a minimum parameter set from the DUT for the minimum depth positions; sending commands to the robot to position the tuning screws to a third set of positions corresponding to an average depth position for each screw; and acquiring a mean parameter set from the DUT for the average depth positions.

Example 15 is the method of any of Examples 11 through 14, wherein generating a parameter set image for each set of operating parameters comprises generating an XY plot of the operating parameters, the operating parameters being S-parameters, and plotting an imaginary portion of the S-parameters on one axis and a real portion of the S-parameters on the other axis.

Example 16 is the method of any of Examples 11 through 15, wherein generating a parameter set image comprises: placing different operating parameters extracted from the operating parameter sets into different quadrants of the parameter set images, each parameter set having a corresponding parameter set image; and placing the parameter set image for each operating parameter set into different channels of an RGB image to produce the combined image.

Example 17 is the method of any of Examples 11 through 16, wherein creating a parameter set image comprises: creating XYZ plots of each operating parameter set, the XYZ plots having the Z-axis as amplitude, the X-axis as frequency, and the Y-axis is a position for each real or imaginary portion of each S-parameter; and placing XYZ plots of each operating parameter set onto a different channel of an RGB image.

Example 18 is the method of any of Examples 11 through 17, wherein adjusting the predicted set of values comprises: de-normalizing the predicted set of values; and adding one of the parameter sets to the predicted set of values to produce the predicted set of positions.

Example 19 is the method of any of Examples 11 through 18, further comprising training the machine learning system.

Example 20 is the method of Example 19, wherein training the machine learning system comprises: tuning a plurality of devices under test (DUT) having tuning elements to their optimal tuning parameters to produce optimal tuning parameter sets; computing a mean from all the optimal tuning parameter tuning sets to obtain mean parameter reference sets; using the robot to position the tuning elements to positions determined by different parameter sets, the different parameter sets including the mean parameter reference set; for each parameter set, acquiring operational parameter sets from the plurality of DUTs; creating a parameter image for each set of operational parameters; combining the parameter images of all the parameter sets into combined images to produce an array of combined images, the array comprising combined images for each of the plurality of DUTs; and using the array of combined images to train the machine learning system.

Although specific examples of the invention have been illustrated and described for purposes of illustration, it will be understood that various modifications may be made without departing from the spirit and scope of the invention. Accordingly, the invention should not be limited except as by the appended claims.

The invention claimed is:
1. A test and measurement instrument, comprising:
one or more ports to connect to one or more devices under test (DUT) having tuning screws, and to a robot; and
one or more processors configured to execute code, the code to cause the one or more processors to:
send commands to the robot to position the tuning screws on the one or more DUTs to one or more sets of positions, each set of positions comprises a parameter set for the tuning screws;
acquire a set of operating parameters for each parameter set from the one or more DUTs;
generate a parameter set image for each set of operating parameters, wherein the parameter set image includes a plot of an operating parameter of the one or more DUTs;
create a combined image of the parameter set images, wherein the combined image uses a different channel for each of the parameter set images;
provide the combined image to a machine learning system to obtain a predicted set of values;
adjust the predicted set of values as needed to produce a set of predicted positions;
send commands to the robot to position the tuning screws on the one or more DUTs to positions in the set of predicted positions;

obtain a set of tuned operating parameters from the one or more DUTs; and validate operation of the one or more DUTs based upon the tuned operating parameters.

2. The test and measurement instrument as claimed in claim 1, wherein the parameter sets comprise at least three parameter sets.

3. The test and measurement instrument as claimed in claim 1, wherein the operating parameters comprise one of S-parameters, S-parameters in the time domain, H-parameters, Z-parameters, or X-parameters.

4. The test and measurement instrument as claimed in claim 1, wherein the code to cause the one or more processors to send commands to the robot to position the tuning screws and acquire sets of operating parameters, comprises code to cause the one or more processors to:

send commands to the robot to position the tuning screws to a first set of positions corresponding to a maximum depth position for each screw;

acquire a maximum parameter set from the DUT for the maximum depth positions;

send commands to the robot to position the tuning screws to a second set of positions corresponding to a minimum depth position for each screw;

acquire a minimum parameter set from the DUT for the minimum depth position;

send commands to the robot to position the tuning screws to a third set of positions corresponding to an average depth position for each screw; and acquire a mean parameter set from the DUT for the average depth position.

5. The test and measurement instrument as claimed in claim 1, wherein the code to cause the one or more processors to generate a parameter set image for each set of operating parameters, comprises code to cause the one or more processors to generate an XY plot of the operating parameters, the operating parameters being the S-parameters, and to plot an imaginary portion of the S-parameters on one axis and a real portion of the S-parameters on the other axis.

6. The test and measurement instrument as claimed in claim 1 wherein the code to cause the one or more processors to generate a parameter set image comprises code to cause the one or more processors to:

place different operating parameters extracted from the operating parameter sets into different quadrants of the parameter set images, each parameter set having a corresponding parameter set image; and place the parameter set image for each operating parameter set into different channels of an RGB image to produce the combined image.

7. The test and measurement instrument as claimed in claim 1, wherein the code to cause the one or more processors to generate a parameter set image comprises code to cause the one or more processors to:

create XYZ plots of each operating parameter set, the XYZ plots having the Z-axis as amplitude, the X-axis as frequency, and the Y-axis is a position for each real or imaginary portion of each S-parameter; and place XYZ plots of each operating parameter set onto a different channel of an RGB image.

8. The test and measurement instrument as claimed in claim 1, wherein the code to cause the one or more processors to adjust the predicted set of values comprises code to cause the one or more processors to:

de-normalize the predicted set of values; and add one of the parameter sets to the predicted set of values to produce the predicted set of positions.

9. The test and measurement instrument as claimed in claim 1, wherein the one or more processors are further configured to execute code to cause the one or more processors to train the machine learning system.

10. The test and measurement instrument as claimed in claim 9, wherein the code to cause the one or more processors to train the machine learning system comprises code to cause the one or more processors to:

tune a plurality of devices under test (DUT) having tuning screws to their optimal tuning parameter to produce optimal tuning parameter sets;

compute a mean from all the optimal tuning parameter tuning sets to obtain meanPar parameter reference sets;

use the robot to position the tuning screws to positions determined by different parameter sets including the meanPar parameter reference set;

for each parameter set acquire operational parameter sets from the plurality of DUTs;

create a parameter image for each set of operational parameters;

combine the parameter image of all the parameter sets into a combined image to produce an array of combined images, the array comprising combined images for each of the plurality of DUTs; and use the array of combined images to train the machine learning system.

11. A method of testing a device under test (DUT) having tuning elements, comprising:

sending commands to a robot to position tuning elements on the DUT to one or more sets of positions, each set of positions comprises a parameter set for the tuning elements;

acquiring a set of operating parameters for each parameter set from the DUT;

generating a parameter set image for each set of operating parameters, wherein the parameter set image includes a plot of an operating parameter of the one or more DUTs;

creating a combined image of the parameter set images, wherein the combined image uses a different channel for each of the parameter set images;

providing the combined image to a machine learning system to obtain a predicted set of values;

adjusting the predicted set of values as needed to produce a set of predicted positions;

sending commands to the robot to position the tuning elements on the DUT to positions in the set of predicted positions;

obtaining a set of tuned operating parameters from the DUT; and validating operation of the DUT based upon the tuned operating parameters.

12. The method as claimed in claim 11, wherein the parameter sets comprise at least three parameter sets.

13. The method as claimed in claim 11, wherein the operating parameters comprise one of S-parameters, S-parameters in the time domain, H-parameters, Z-parameters, or X-parameters.

14. The method as claimed in claim 11, wherein the tuning elements comprise tuning screws, and wherein sending commands to the robot to position the tuning elements and acquiring sets of operating parameters, comprises:

sending commands to the robot to position the tuning screws to a first set of positions corresponding to a maximum depth position for each screw;

acquiring a maximum parameter set from the DUT for the maximum depth positions;

sending commands to the robot to position the tuning screws to a second set of positions corresponding to a minimum depth position for each screw;

acquiring a minimum parameter set from the DUT for the minimum depth positions;

sending commands to the robot to position the tuning screws to a third set of positions corresponding to an average depth position for each screw; and acquiring a mean parameter set from the DUT for the average depth positions.

15. The method as claimed in claim 11, wherein generating a parameter set image for each set of operating parameters comprises generating an XY plot of the operating parameters, the operating parameters being S-parameters, and plotting an imaginary portion of the S-parameters on one axis and a real portion of the S-parameters on the other axis.

16. The method as claimed in claim 11, wherein generating a parameter set image comprises:

placing different operating parameters extracted from the operating parameter sets into different quadrants of the parameter set images, each parameter set having a corresponding parameter set image; and placing the parameter set image for each operating parameter set into different channels of an RGB image to produce the combined image.

17. The method as claimed in claim 11, wherein creating a parameter set image comprises:

creating XYZ plots of each operating parameter set, the XYZ plots having the Z-axis as amplitude, the X-axis as frequency, and the Y-axis is a position for each real or imaginary portion of each S-parameter; and placing XYZ plots of each operating parameter set onto a different channel of an RGB image.

18. The method as claimed in claim 11, wherein adjusting the predicted set of values comprises:

de-normalizing the predicted set of values; and adding one of the parameter sets to the predicted set of values to produce the predicted set of positions.

19. The method as claimed in claim 11, further comprising training the machine learning system.

20. The method as claimed in claim 19, wherein training the machine learning system comprises:

tuning a plurality of devices under test (DUT) having tuning elements to their optimal tuning parameters to produce optimal tuning parameter sets;

computing a mean from all the optimal tuning parameter tuning sets to obtain mean parameter reference sets;

using the robot to position the tuning elements to positions determined by different parameter sets, the different parameter sets including the mean parameter reference set;

for each parameter set, acquiring operational parameter sets from the plurality of DUTs;

creating a parameter image for each set of operational parameters;

combining the parameter images of all the parameter sets into combined images to produce an array of combined images, the array comprising combined images for each of the plurality of DUTs; and using the array of combined images to train the machine learning system.

* * * * *